(12) United States Patent
White

(10) Patent No.: X8977
(45) Date of Patent: Jul. 18, 1835

(54) COFFINS, OF ARTIFICAIAL STONE OR MARBLE

(76) Inventor: John White

John White, of Syracuse State of New York,

Letters Patent.

The schedule referred to in these Letters Patent and making part of the same containing a description in the words of the said John White himself of his improvement in making artificial stone or marble coffins from American or Hydraulic cement.

The specification of an improvement by John White for making artificial stone or marble coffins from American or Hydraulic cement as Patented by the United States to Daniel Dayton, Hiram Hoyt and the said John White. To all to whom these presents shall come, Be it known that I John White of Syracuse, and County of Onondaga & State of New York, have invented or discovered a new and useful improvement in the making and constructing of coffins from American or Hydraulic Cement. The coffin may be constructed in like manner as in said Letters Patent specified or in any other manner or shape desired, after the coffin is formed and ready to receive the corpse and before the corpse is put in the coffin is covered over the bottom a few inches thick with soft cement, the corpse is then put in and the whole coffin (except about the face of the corpse as desired) is then filled up full with soft cement, so that when the cover or top is put on the whole coffin (except about the face of the corpse as desired) is filled full, The Object and benefit of this improvement is to exclude the air from the corpse & also to support the corpse so that the coffin may be placed upright in a vault if desired, The coffin may be made in any shape by using moulds or forms of the shape desired, And if to be set upright may be in the form of Statues, These coffins may be formed originally by using for the inner mould a mould of wood or other material as near the size and form of the corpse as may be and which mould should be in two parts and the coffin formed by moulding in halves in the ordinary way of casting or the corpse may be at once laid in cement in a wooden or ordinary coffin, and after the cement has become suf-
ficiently set the wood may if desired be removed, in that case care should
be taken to surround the head or face as desired with glass, or other material
when the coffin is filled in with the cement; The cement is composed
of one part of common water lime, and one, two, three, or more parts of sand,
pulverized marble, granite, unburned lime stone or other stone, according to the
quality of the lime and sufficient water to reduce the same to a thin mortar

What I claim as my improvement and desire patented, is the
filling in of the coffin (whether originally made of the cement where the corpse
is put in for the purpose of secluding the air from the corpse, and also supporting
the corpse when the coffin is placed in an erect position

In witness whereof I have hereunto set my hand this 13th
day of June, in the year one thousand eight hundred & thirty five Witnesses
Chs. Sherwood
A. Kirkland John White Exd.
CLJW.